United States Patent
Kreschel (10) Patent No.: US 12,551,958 B2
(45) Date of Patent: Feb. 17, 2026

(54) METHOD FOR PRODUCING OR MACHINING, BY CUTTING, AN IDENTICAL SET OF TEETH ON EACH OF A PLURALITY OF WORKPIECES, AND MACHINE GROUP AND CONTROL PROGRAM THEREFOR

(71) Applicant: GLEASON-PFAUTER MASCHINENFABRIK GMBH, Ludwigsburg (DE)

(72) Inventor: Jürgen Kreschel, Hemmingen (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 975 days.

(21) Appl. No.: 17/754,077

(22) PCT Filed: Sep. 23, 2020

(86) PCT No.: PCT/EP2020/076635
§ 371 (c)(1),
(2) Date: Mar. 23, 2022

(87) PCT Pub. No.: WO2021/063782
PCT Pub. Date: Apr. 8, 2021

(65) Prior Publication Data
US 2022/0331893 A1 Oct. 20, 2022

(30) Foreign Application Priority Data
Sep. 30, 2019 (DE) .......................... 102019006809.2

(51) Int. Cl.
*B23F 23/12* (2006.01)
*B23F 1/04* (2006.01)

(52) U.S. Cl.
CPC ............ *B23F 23/1225* (2013.01); *B23F 1/04* (2013.01); *B23F 23/1218* (2013.01)

(58) Field of Classification Search
CPC ..... B23F 5/163; B23F 23/1218; G05B 19/186
See application file for complete search history.

(56) References Cited

U.S. PATENT DOCUMENTS

| 4,115,956 | A | 9/1978 | Huffman |
| 8,463,575 | B2 * | 6/2013 | Kikuchi .............. B23F 23/1218 702/94 |

(Continued)

FOREIGN PATENT DOCUMENTS

| DE | 102017011978 A1 | 6/2019 |
| EP | 1084786 A1 | 3/2001 |

(Continued)

OTHER PUBLICATIONS

International Search Report and Written Opinion for PCT/EP2020/076635, ISA/EPO, Dec. 23, 2020, 15 pgs.

*Primary Examiner* — Michael W Hotchkiss
(74) *Attorney, Agent, or Firm* — Robert L. McDowell (57) ABSTRACT

The invention relates to a method for producing or machining, by cutting, an identical set of teeth on each of a plurality of workpieces, in particular at least 4 workpieces, of a workpiece batch on one or more gear-cutting machines (100) having a gear-cutting tool (S), which has a set of teeth having rake faces (5) and having an axis of rotation (B1), in rolling machining engagement, in which method, in the event that a deviation of a set of teeth from the tooth profile sought for said set of teeth is detected or expected, a countermeasure that counteracts said deviation is determined and the production/machining of additional workpieces of said workpiece batch is continued using the countermeasure, the countermeasure being, at least in part, a change in the position of the rake faces relative to the axis of rotation of the tool, which change is brought about by means of grinding performed on the gear-cutting machine or (Continued)

at a grinding machine (140) that belongs to the machine group of the gear-cutting machine.

11 Claims, 10 Drawing Sheets

(56) References Cited

U.S. PATENT DOCUMENTS

| | | | | |
|---|---|---|---|---|
| 2012/0009848 | A1* | 1/2012 | Heidelmann | B23F 5/00 |
| | | | | 451/5 |
| 2012/0209418 | A1* | 8/2012 | Winkel | G05B 19/19 |
| | | | | 700/159 |
| 2019/0076944 | A1* | 3/2019 | Würfel | B23F 23/006 |
| 2020/0368835 | A1* | 11/2020 | Huber | G05B 19/4065 |
| 2021/0178499 | A1* | 6/2021 | Weppelmann | B24B 53/053 |

FOREIGN PATENT DOCUMENTS

| | | | |
|---|---|---|---|
| EP | 2537615 | A1 | 12/2012 |
| EP | 3456453 | A1 | 3/2019 |

\* cited by examiner

METHOD FOR PRODUCING OR MACHINING, BY CUTTING, AN IDENTICAL SET OF TEETH ON EACH OF A PLURALITY OF WORKPIECES, AND MACHINE GROUP AND CONTROL PROGRAM THEREFOR

The invention relates to a method for producing or machining, by cutting, an identical set of teeth on each of a plurality of workpieces, in particular at least 4 workpieces, of a workpiece batch on one or more gear-cutting machine(s) having a gear-cutting tool, which has a set of teeth having rake faces and having an axis of rotation, in rolling machining engagement, in which method, in the event that a deviation of a set of teeth from the tooth profile sought for said set of teeth is detected or expected, a countermeasure that counteracts said deviation is determined and the production/machining of additional workpieces of said workpiece batch is continued using the countermeasure.

Such methods and countermeasures are known. It can happen repeatedly that gear-cutting tools designed for certain workpiece gear teeth do not produce exactly the tooth profile on the workpiece gear that is sought. For example, during the skiving of a set of teeth on the left and/or right tooth flank, a profile angle deviation that is too high is determined, for example by measuring a first workpiece or a plurality of first workpieces of a workpiece batch. If there are only a small number of workpieces, countermeasures could only be contemplated during later hard-fine machining after the workpieces have been hardened in the interim, but this leads to a considerable burden on the subsequent hard-fine machining process, especially in the case of larger quantities of a workpiece batch, and in some cases would then be difficult to compensate if the deviations were too great.

Therefore, it is precisely in the case of larger workpiece batches that one responds in the technology, even during the machining itself, by a countermeasure already being used for the machining of subsequent workpieces in the workpiece batch in order to bring these subsequent workpieces closer to the desired tooth profile.

For this purpose, the flexibility and machining accuracy of modern CNC-controlled gear-cutting machines are used by a modification of the machining intervention that counteracts the detected deviation being set by machine axis corrections. For example, in the case of gear skiving, the pivot axis of the skiving machine can be set to a modified cross-axis angle of the tool axis of rotation relative to the workpiece axis of rotation, or an offset of the machining position can be set using a tangential carriage, for example. For further details regarding the relationships between these conditions during skiving, reference is made to EP 2537615 A1, to which this application refers with regard to these aspects, the cutting conditions and the kinematics of the skiving. This allows an extremely flexible correction method, and corresponding controllers that independently calculate the necessary machine axis changes are therefore implemented in modern CNC machines made by numerous manufacturers.

The object of the invention is to further improve a method of the type mentioned at the outset, in particular with regard to a satisfactory combination of flexibility and tool service life.

This object is achieved by the invention in terms of processing technology by the countermeasure being, at least in part, a change in the position of the rake faces relative to the axis of rotation of the tool, which change is brought about by means of grinding performed on the gear-cutting machine or at a grinding machine that belongs to the machine group of the gear-cutting machine.

The invention thus shifts a portion, in particular a predominant portion, of the countermeasure, from a dynamic correction into a structural change of the tool, specifically into a change of the relative position of the rake faces with respect to the tool axis of rotation. These rake faces, preferably planar rake faces according to the invention, are determined in their position relative to the tool axis of rotation in a typical design of a step-cut cutting wheel by the step angle, i.e., the inclination of the rake face relative to the plane orthogonal to the tool axis of rotation, seen in the circumferential direction, and in some cases by a non-zero angle tip rake angle, i.e., the inclination of the rake face relative to this plane in the direction radial to the tool axis of rotation.

According to the invention, this position or positional orientation of the rake faces is changed by regrinding in place. The gear-cutting tool preferably remains clamped in the gear-cutting machine itself for regrinding. With the method according to the invention, the dynamic corrections explained above are no longer required to bring the other workpieces of the workpiece batch closer to the desired tooth profile, or at least only to a lesser extent, which means that the gear-cutting tool remains used in machine axis settings that are closer to the machine axis settings for which the tool was designed with the conicity selected for the gear-cutting tool, so that in the most favorable case the effective clearance angles are retained in their entirety. This prevents process forces from shifting over the service life of the gear-cutting tool, which was recognized as a factor that increases the load on the gear-cutting tools and accordingly reduces the tool service life.

However, the flexibility of the method is retained by regrinding the gear-cutting tool in place, even though this involves accepting the time and machinery required for the regrinding.

The method is suitable for smaller workpiece batches having 4 or more, 10 or more, even 20 or more workpieces, as well as for larger workpiece batches having 50 or more, even 100 or 200 or more workpieces.

There can be various reasons for the situation in which it may be decided to regrind the gear-cutting tool. One could correct faults that occur over the course of the regular service life of the gear-cutting tool, but also address, for example, a different desired tooth profile than, for example, the intended final geometry plus allowance, if, for example, a tendency toward hardening distortions is observed that needs to be compensated for in advance, or other cases, in which, for example, there is still leeway for a better approximation of the desired tooth profile.

The gear-cutting tool is preferably a cutting wheel, namely, in particular, a skiving wheel for skiving or a skiving wheel for hard skiving a set of teeth that has already been pre-cut and hardened after pre-cutting, or a shaping wheel for shaping gear teeth. A hard metal or a powder metal high-speed steel (PM-HSS) material could be used as the base material, but other materials could also be used. In some cases, a wear-resistance-enhancing coating may be provided, such as Al, CrN, or any other coating that is common to those skilled in the art, such as TiN.

In a preferred embodiment of the method, it is provided that the gear-cutting tool is no longer subjected to a coating having a wear-resistance-enhancing layer between its grinding processing and the continuation of its use, as is otherwise customary in the art after, for example, mere resharpening. In this way, a time-consuming coating process is no longer expected and no longer has a time-delaying effect. Overall, it is preferred that the gear-cutting tool tends to be ready for use again rather quickly after being reground and is in particular used preferably within at least 24 hours, more preferably within 12 hours, or even within 6 hours. If a plurality of identical gear-cutting tools is available, machining can also be continued with one of these same tools after regrinding.

The use of the gear-cutting tool is preferably continued on exactly the same gear-cutting machine, but in larger systems having a plurality of, in particular identical, gear-cutting machines that process workpiece batches of the same type in parallel, use could also be continued on such a parallel machine.

In a preferred embodiment of the method, the rake faces are ground to a modified tip rake angle during grinding, i.e., the tip rake angle is changed by regrinding. A reduction in the tip rake angle causes an increase in the profile angle or pressure angle on the tooth profile of the workpiece gearing, whereas an increase in the tip rake angle leads, vice-versa, to a reduction in the profile angle on both tooth flanks of the workpiece gearing (when working with the two-flank method). A regrinding in this regard is therefore particularly suitable for correcting or influencing deviations that occur predominantly symmetrically on the left and right flanks of the workpiece gearing.

Furthermore, alternatively or additionally, it is preferably provided that grinding or regrinding is carried out to a modified step angle during the grinding process. This leads to an asymmetrical influence on one flank and the other flank of the workpiece gearing. If, for example, a profile angle on the left flank is increased by reducing the step angle, this would not be increased on the right flank side (in the two-flank method), but rather, reduced. Accordingly, an asymmetry portion of the profile error relative to the deviation on the left and right flank is preferably counteracted by modifying the step angle.

To illustrate and state it simply, with a profile angle deviation of +5 on the left flank and +1 on the right flank of the workpiece gearing, one could, for example, make a step angle modification of −2 relative to the left flank and a modification of the tip rake angle of −3. On the left flank, these corrections are additive and counteract the profile angle deviation of +5 with −5; on the right flank, the step angle modification counteracts the tip rake angle modification, so that the total modification of −1 also compensates for the +1 of the profile angle deviation.

The method according to the invention can also include the dynamic corrections explained above as an additional countermeasure. It is therefore definitely intended that the countermeasure, in addition to changing the relative position of the rake faces, also includes a dynamic correction in the form of machine axis movements modified compared to the machine axis movements for the production/machining of the gear teeth or the originally intended production/machining of the gear teeth having the detected deviation or deviation to be detected. Examples of this are already mentioned in the introduction to the description which can also be used for this further development of the invention.

In this context, it is preferably provided that the dynamic correction is calculated independently by the controller that controls the machine axes for the machining operation depending on the modification made to the rake faces. For example, a machine operator receives from the machine controller correction values or target values for the regrinding of the gear-cutting tool calculated from the deviation from the tooth profile sought when a countermeasure to be taken is identified. The grinding machine can then semi-automatically or automatically be tasked with the appropriately controlled regrinding. However, it is also conceivable for the operator to decide on a lesser regrinding, which would only lead to a partial correction of the deviation, and for the remaining deviation to be carried out via the dynamic correction.

It is also possible that, although the entire deviation is to be corrected via the regrinding, a need for correction that is to be corrected dynamically is detected at a possibly later point in time. In this case, the gear-cutting machine will use the previously reground tool contour as a basis for determining the required machine axis corrections and not the original tool contour before the regrinding.

As already indicated above, the regrinding of the gear-cutting tool can be carried out on a grinding machine belonging to the machine group of the gear-cutting machine, for example on a grinding machine that is mechanically linked to the gear-cutting machine in the machine combination. In any case, the controllers, if provided separately, should preferably be linked in order to allow data exchange with regard to the regrinding parameters explained above. In a preferred embodiment, the gear-cutting tool could be brought to the grinding machine via a tool exchange system or in some other way. In an even more preferred embodiment, at least in this case of a gear-cutting machine that processes the workpiece batch by itself, the gear-cutting tool can be reground without having to unclamp it from the tool head of the gear-cutting machine. In a method configuration that is preferred in this regard, a machine axis of the machining intervention can be used to position the gear-cutting tool during its grinding operation.

In terms of device technology, the invention is protected by a corresponding machine group with a controller according to the above aspects, as well as by the control program itself.

The advantages of the technical realization according to the invention result from the advantages of the method aspects explained above.

In an additional aspect, the in-place grindability can also be used to regrind the gear-cutting tool, i.e., to carry out a grinding process of the rake faces in which the position of the rake faces in relation to the tool axis of rotation does not change, rather, only their height relative to a reference point on the tool axis of rotation.

Further features, details, and advantages of the invention can be found in the following description with reference to the accompanying drawings, in which.

Figure 1:
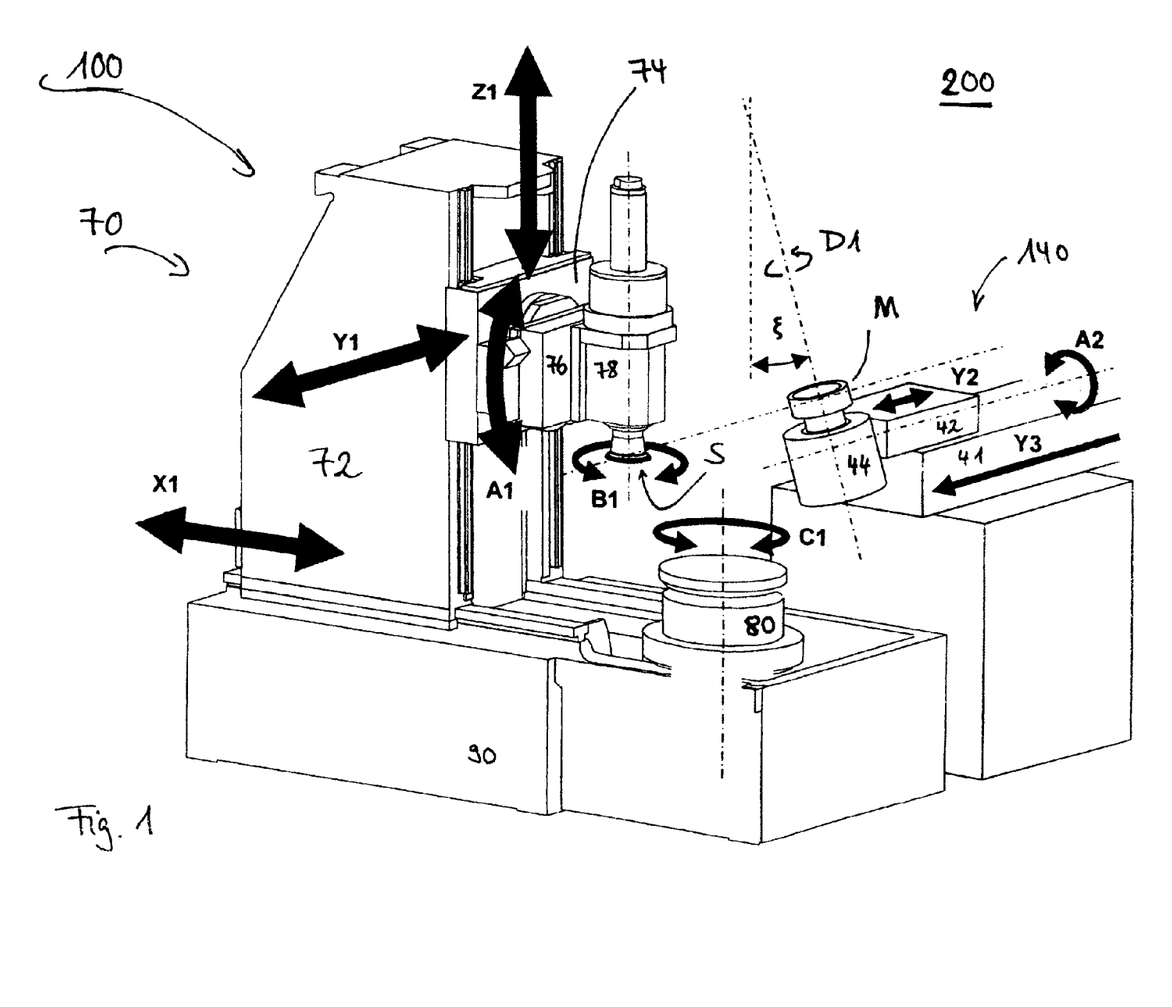
FIG. 1 shows a gear-cutting machine with integrated grinding machine.

The machine tool shown in FIG. 1 is a machine 100 designed for skiving with a skiving wheel S. On the workpiece side, the machine 100 has a tool table 80, which is mounted in the machine bed 90 in a rotatably driven manner and in which a workpiece to be machined (not shown in FIG. 1), for example with an internal gearing to be machined, is clampable so as to be rotatable about the machine axis of rotation C1 on the tool side.

On the tool side, the machine 100 has a linear machine axis X1 for a radial positioning movement of the tool relative to the workpiece, an axis Z1 for a movement of the tool along the axial direction of the table axis C1, and an axis Y1 for a tangential relative movement between the tool and the workpiece. These linear axes X1, Z1 are perpendicular to each other and are implemented via a carriage arrangement 70 in which a linear carriage 72 for the X1 movement carries a vertical carriage 74 for the Z1 movement. The tool head 78 carrying the tool S, which in this embodiment also carries a CNC drive as a direct drive for the tool rotation with the axis of rotation B1, can be moved with a linear carriage 76 for the tangential movement Y1. However, the tangential carriage 76 is rotatably arranged on the vertical carriage 74 with pivot axis A1, so that its carriage movement is only horizontal in the position shown in FIG. 1 and is otherwise inclined relative to the Z1 axis by the set pivot angle A1.

The gear-cutting machine 100 together with a grinding machine 140, also shown in FIG. 1, forms a machine combination 200. The grinding machine 140 could also have its own clamping for the tool to be reground, but the clamping kept on the tool spindle of the gear-cutting machine 100 is preferred.

The grinding machine 140 has a movement system with which a grinding tool M can be brought into grinding engagement with the skiving wheel S clamped in the tool clamping of the tool head 78, wherein the tool-side linear and rotational axes also are (can be) used for the production of the grinding engagement. In the illustrated embodiment, the grinding tool M, which in this embodiment is configured in the form of a cup wheel, is movable in a tangential direction Y that is orthogonal to the X1-Z1 plane. It can thus be introduced into the machining space laterally relative to the radial direction X1. This movement in the Y-direction is implemented by a double carriage 41, 42, of which the lower carriage 41 is provided for positioning with axis Y3, while the upper carriage 42 is provided for the lifting movement in the grinding operation. In addition, a grinding spindle 44, which carries the grinding tool M and is driven in rotation about axis D1, is arranged to be pivotable in a plane orthogonal to the Y direction (the pivot axis is denoted by A2), so that an angle is formed in a plane running parallel to the X1-Z1 plane between the axial direction of the axis of rotation D1 and the axis Z1 (C1).

Variants are also conceivable in which the Y1 axis (possibly in combination with Z1) of the tool head 78 is used for the grinding stroke movement and in some cases axes on the grinding head such as Y2 are then saved. Also conceivable is an additional axis X2 of the grinding head parallel to the X1 direction, or else a further pivot axis with pivot axis X2.

If it is now determined for a workpiece that has already been machined by the skiving wheel S (e.g. by measuring on a gearing test machine, not shown) that its tooth profile deviates from a predetermined desired tooth profile, this is signaled and, in this embodiment, it is decided that further workpieces of the same workpiece batch are to be machined only after modification of the skiving wheel S, which counteracts the detected profile deviation. The controller (not shown) of the machine combination 200 calculates the changes (in step angle and/or tip rake angle) required for the orientation of the rake faces (of their normal vector), and the grinding machine 140 performs a grinding operation on the skiving wheel S in order to modify it in accordance with these specifications.

This is described below for a skiving wheel S, which is implemented in the step grinding (see also FIG. 2) and has a non-zero tip rake angle. In this case, the grinding tool M is pivoted in to the modified step angle of the skiving wheel S with pivot axis A2. The pivot axis A1 of the skiving wheel S is pivoted in to the modified tip rake angle of the skiving wheel S. In this setting, a center line of a rake face 5 to be reground (in the indexing method) and facing the side of the grinding tool M runs horizontally in the 90° position relative to the radial axis X1. During the grinding stroke movement (axis Y2), the machining region then moves along the rake face 5 during the grinding stroke, wherein the orientation of the grinding region of the cup wheel M matches the orientation of the modified rake face, so that the rake face 5 can be reground accordingly. It goes without saying that the Z1 axis of the skiving wheel S can be used for the height adjustment of the machining engagement and the delivery, while the XY machine axes are used for positioning.

By feeding the grinding tool M laterally relative to the radial axis X1, competing space requirements on the machine side are avoided. In addition, due to the parallelism of the grinding stroke and feed direction, vibrations during regrinding are largely avoided. When all rake faces 5 have been successively reground in indexing machining in this way, the grinding tool M is retracted and the gear machining by the skiving wheel S can be resumed and continued.

The changes resulting from the changed shape of the skiving wheel due to the regrinding are automatically adopted in the machine controller. The machine controller has all the necessary information from the tool design originally stored therein and knowledge of the cutting performed during the regrinding via the axial positions of the machine axes used in this process. If a corrective measure was decided solely by regrinding, the continued machining is performed with the same machine axis controller as before. However, provision can also be made for correcting only a (particularly predominant) portion of the required countermeasure by regrinding. In this case, the machine controller automatically calculates the correction component that has not yet been taken into account depending on the data of the reground tool and, with regard to this correction component, carries out a dynamic correction, as has been customary in the prior art, by changing the machine axis settings for the machining engagement, for example by a modified pivot setting (axis A1) or eccentricity (axis Y1).

However, in alternative embodiments, the grinding stroke could also be performed in the X1 machine direction, if, for example, the side of the tool is reground that is closest to (0° position, e.g. for internal gearings) or furthest away from (180° position, e.g. for external gearings) the main machine stand (70). In this case, one would preferably leave the pivot axis setting of the tool head 78 set to the machining axis cross angle. For example, if the workpiece machining is that of internal gearings, where work is carried out in the zero° position, one could set the 180° position to twice the opposite axis crossing angle in order to set the rake face 5 horizontal. However, it is also conceivable not to change the axis crossing angle in this way or to leave it in the machining position. Provision could then be made for the grinding head (44) to receive an additional pivot axis; it is also conceivable to use highly conical outer surfaces on a grinding wheel that is not designed as a cup wheel. In the case without a tip rake angle, radially horizontally running rake faces would then have to be reground; in the case of an existing tip rake angle, the regrinding contact could be maintained, for example, by an additional movement of the machine axis Z1. For this purpose, when using a cup wheel, axis A2 (FIG. 1) could be pivoted onto the tip rake angle; the pivot axis A2 of the regrinding head sets the same orientation of the surface to be ground in the machining operation.

In this variant, one would preferably carry out the regrinding on the side of the tool S which is closest to the main machine stand (carriage arrangement 70) in order to avoid competing for space with the workpiece table 80. This is particularly important when machining internal gearings, because the tool head 78 does not have to be pivoted in via the pivot axis A1. In the case of an external gearing, regrinding would have to be done in the 180° position if one does not intend to pivot in via the pivot axis A1. In the 180° position, conditions for the available installation space are then present which are often more favorable. Particularly in the event that the skiving wheel S does not have a tip rake angle, it is also possible to consider using the rotational movement of the grinding tool M via the spindle carrying the workpieces during machining (in a configuration similar to FIG. 1, the machine table 80) and to carry out the grinding stroke via the radial axis X1. This variant is also conceivable with a tip rake angle not equal to zero, by the radial axis X1 being used for the grinding stroke and a coordinated offset of the engagement region (with respect to the 0° position) with superimposed movements Y1 and Z1 being used.

Superimposition variants in which the grinding stroke is made in a diagonal direction (i.e., having X and Y directional components) can also be implemented about the existing machine axes of the machine configuration shown in FIG. 1 on the one hand for the skiving wheel S and for the grinding tool M. Then the pivot angle (A1 axis) of the skiving wheel S is preferably set depending on the grinding stroke direction and the angle $\xi$ set for the grinding tool M suitable for the modified head rake angle.

Depending on the dimensions of the grinding tool M used, it is also conceivable to completely dispense with the realization of a grinding stroke, namely if a rake face 5 is already completely covered. The regrinding would then be plunge grinding.

In order to precisely determine the relative position between the skiving wheel S and the grinding tool M, it is possible to probe the skiving wheel S with the grinding tool M in the axial direction and in the circumferential direction in order to determine the exact relative height position and relative angular position of the teeth of the tool S with respect to the grinding tool M. This is indicated in particular after a change of machining tool S and/or grinding tool M. This is because pivoting in the grinding head 78 makes it possible to leave the tool S in the machining axis crossing angle. However, the angular position of the tool teeth 4 may already be known due to the previous machining and monitoring of the machine axis B1. Noise detection can be used for contact detection, as can monitoring of the machine axes, for example via a change in torque on the tool or workpiece spindle (B1/C1). Visual detection methods such as sparking could also be used.

Such probing is also preferred when the grinding tool M itself has been subjected to a dressing operation. It can run fully automatically, i.e., the machine combination 200 performs the probing independently, or semi-automatically with rough pre-positioning by an operator, or alternatively software-guided if the operator controls the probing via the machine user interface. A purely manual variant by probing through axis movements using manual control is also conceivable.

If, for example, skiving wheels are used that do not have a step grind, a continuous process for regrinding can be used in addition to the intermittent process, for example with a cup wheel.

If modified tip rake angles of non-zero degrees are to be produced, the rake faces could also be ground in the form of calottes having a surface that is slightly curved in the radial direction. An additional pivot axis (not shown in FIG. 1) of the tool head 78 could also be used to produce head rake angles other than zero degrees.

In principle, a comparatively flat cup could be used as the cup wheel, or else a dish wheel. Compared to a solid cylindrical wheel, only a narrow region is used in the case of a cup wheel, which can then also be dressed more easily and more accurately, which is advantageous for dressing the grinding tool.

Figure 2:
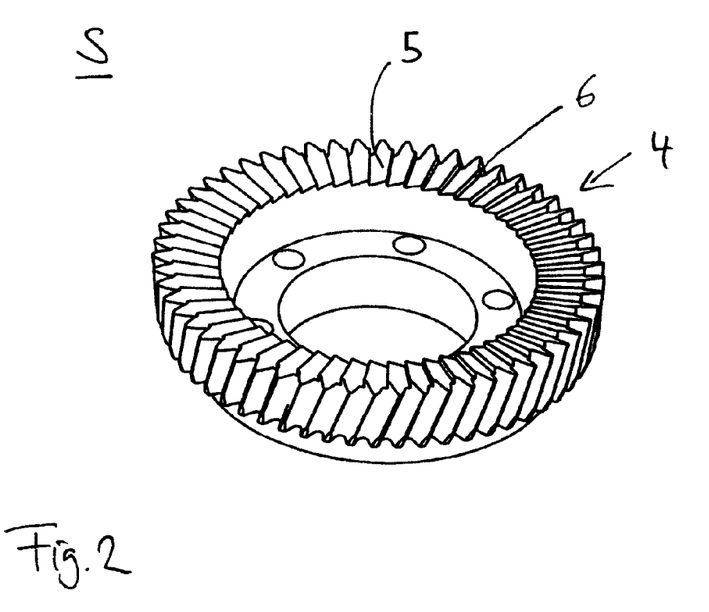
FIG. 2 shows a gear-cutting tool in the form of a step-cut cutting wheel, FIG. 3 schematically shows a grinding engagement on a step-ground tool, FIG. 4 schematically shows a grinding engagement on a cutting wheel with a tip rake angle.
Figure 7:
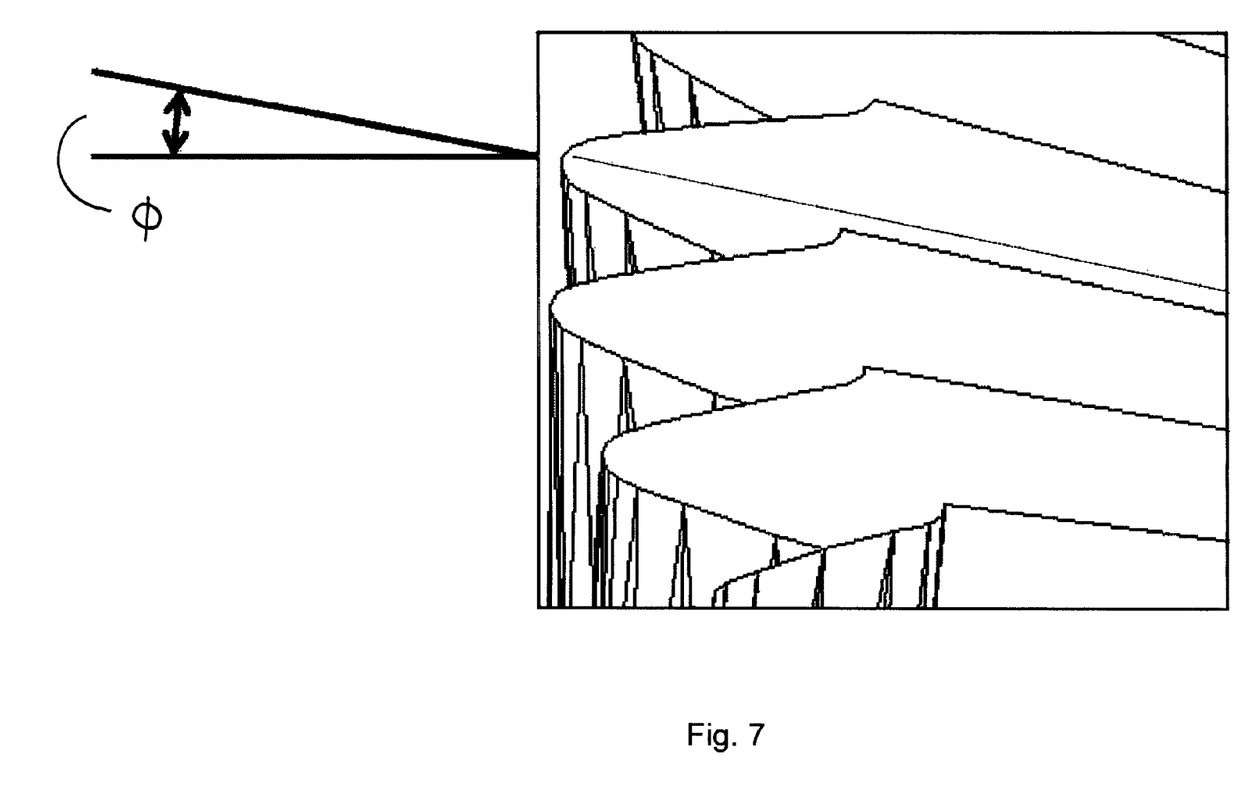
FIG. 7 shows an illustration of a tip rake angle, FIG. 8 schematically shows the effects of modifying the tip rake angle.

FIG. 2 shows the shape of a skiving wheel S which can be used on the machine 100 shown in FIG. 1. The step-cut design of the tool teeth 4 having the step-cut rake faces 5 can be clearly seen. In the tool S shown in FIG. 2, there is a non-zero tip rake angle $\Phi$ (FIG. 7), and the rake faces are also inclined relative to the radial direction.

Figure 3:
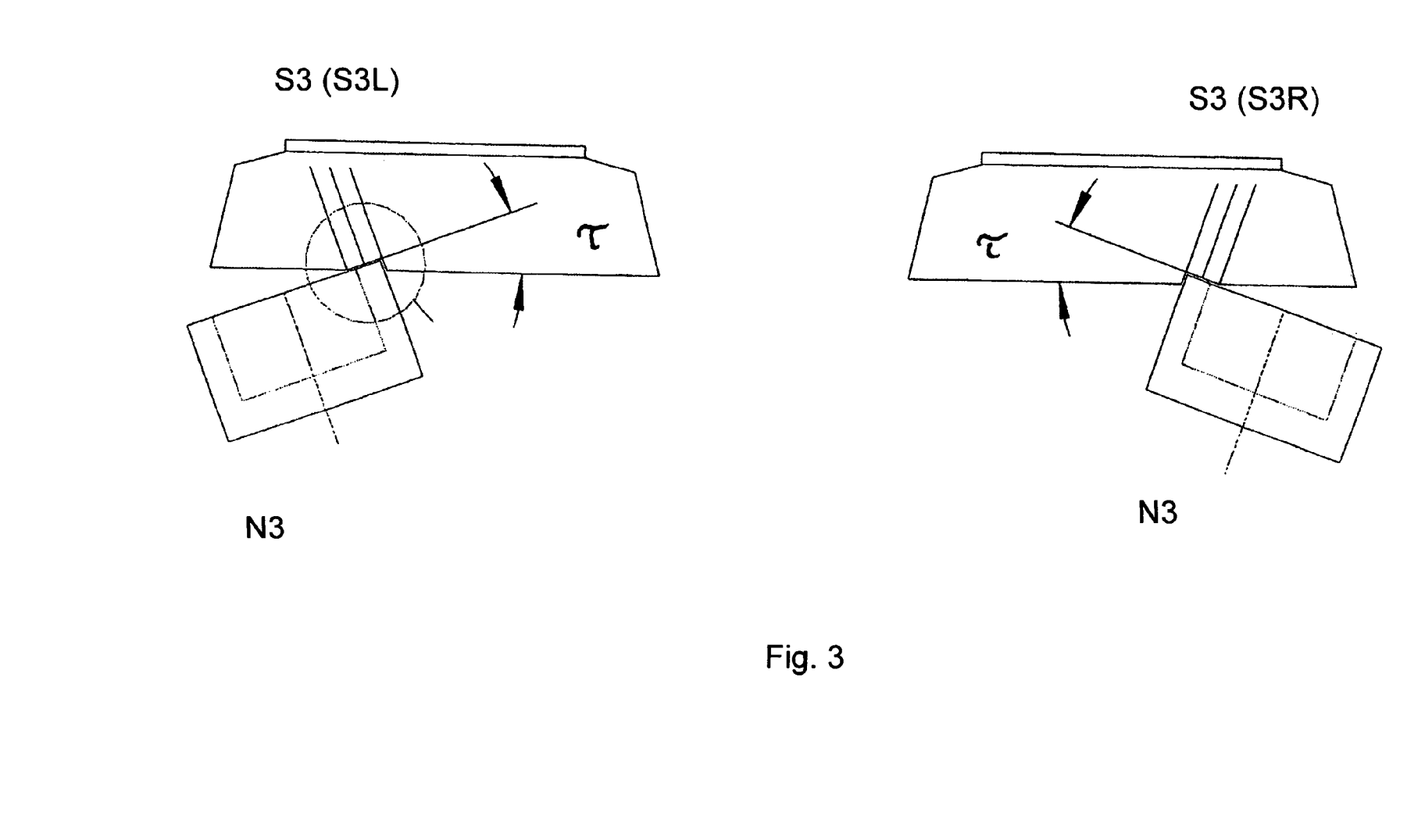

FIG. 3 shows an intervention situation during the regrinding of a cutting wheel S3 with a grinding tool M3 in the form of a cup-shaped grinding wheel. It can be seen that the axes of rotation of the cutting wheel S3 and the grinding tool M3 are pivoted toward one another to match the modified stepped grinding angle $\tau$, once for a right-handed and once for a left-handed cutting design.

Figure 4:
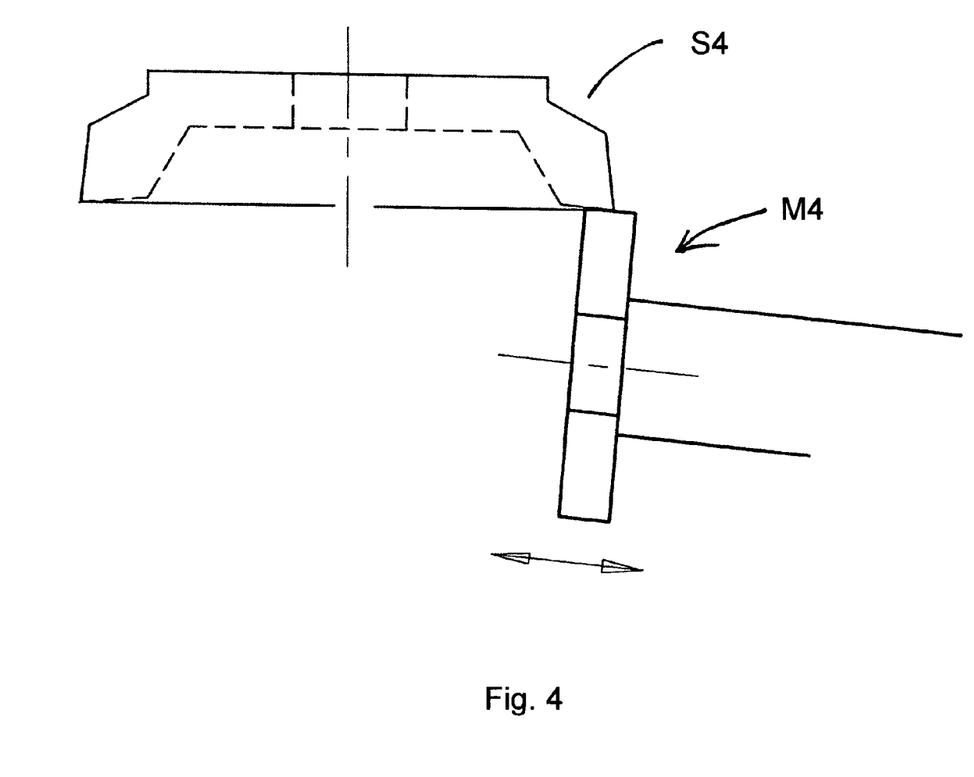

FIG. 4 schematically shows a variant in which a cutting wheel S4 not provided with a step grind is reground by a rotating cylindrical grinding wheel M4. Here you can see how the relative angular position of the respective axes of rotation is set to match the modified tip rake angle of the cutting wheel S4. A grinding stroke movement is indicated by the arrow on both sides. However, it would also be conceivable, for example, to carry out a compensating movement in the direction of the axis of the cutting wheel and to couple it to the grinding stroke. Cylindrical grinding tools of this type, such as M4, could also be used in the case of a step grind, but not in the regrinding position shown in FIG. 4, rather, in a position turned 90° (which is an intermediate position between the 0° close to the skiving head and the 180° remote from the skiving head), in some cases with offset.

Figure 5:
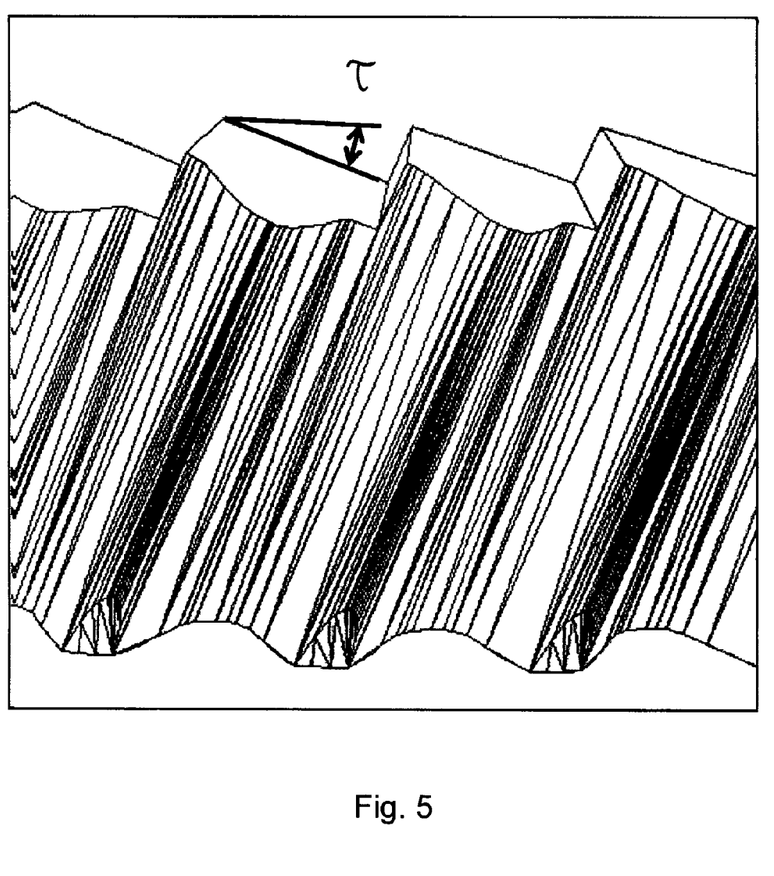
FIG. 5 shows an illustration of a step cut, FIG. 6 schematically shows the effects of modifying the step angle.
Figure 6A:
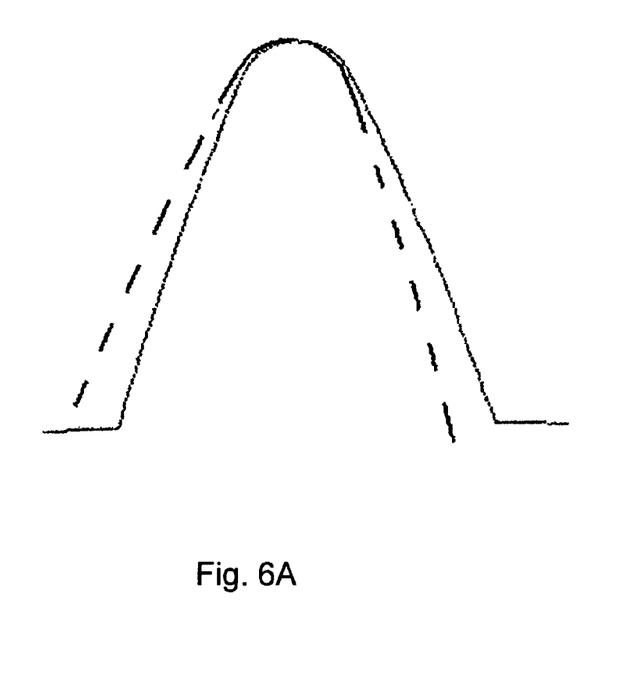
Figure 6B:
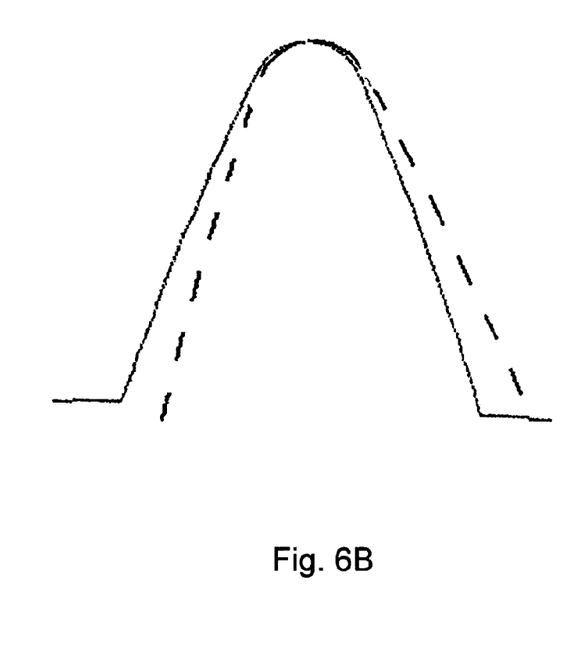

FIG. 5 again shows an illustration of a detail of a step-cut cutting wheel in which the step angle is drawn in. FIG. 6 shows for the purpose of explanation which modifications of the profile of the workpiece gearing are caused by a change in the step angle. Thus, decreasing the step angle in the illustration of FIG. 5 increases the profile angle on the left and decreases the profile angle on the right (FIG. 6A), and increasing the step angle reverses the effect (FIG. 6B). The influence of the modified tool is shown in dashed lines. If you change the tool from rising to the right to rising to the left and vice versa, the influences are mirrored.

Figure 8A:
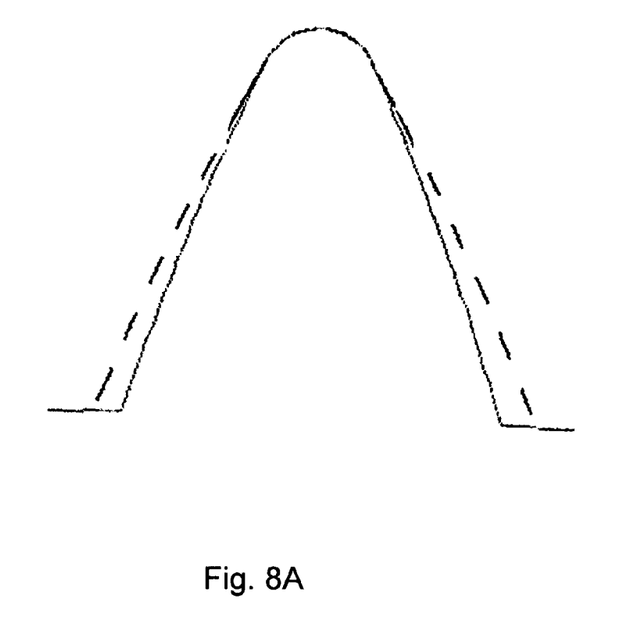
Figure 8B:
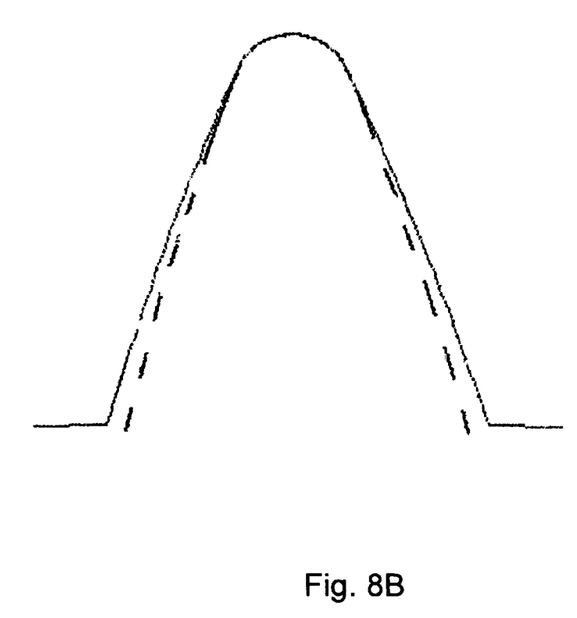

FIG. 7 again shows the tip rake angle $\varphi$ for a detail of the step-cut cutting wheel shown. Similar to FIG. 6, FIG. 8 corresponds to an illustration of the influence of the modification by regrinding the rake faces 5 to a different tip rake angle. Here, decreasing the tip rake angle causes an increase in the profile angle on both sides of the workpiece (FIG. 8A), whereas increasing the tip rake angle causes a decrease in the profile angle on both sides (FIG. 8B).

By superimposing both corrections, a symmetrical portion of a profile deviation can thus be corrected by correcting the tip rake angle, and an asymmetrical portion of the profile deviation can be corrected by the influence of the step angle.

Figure 9A:
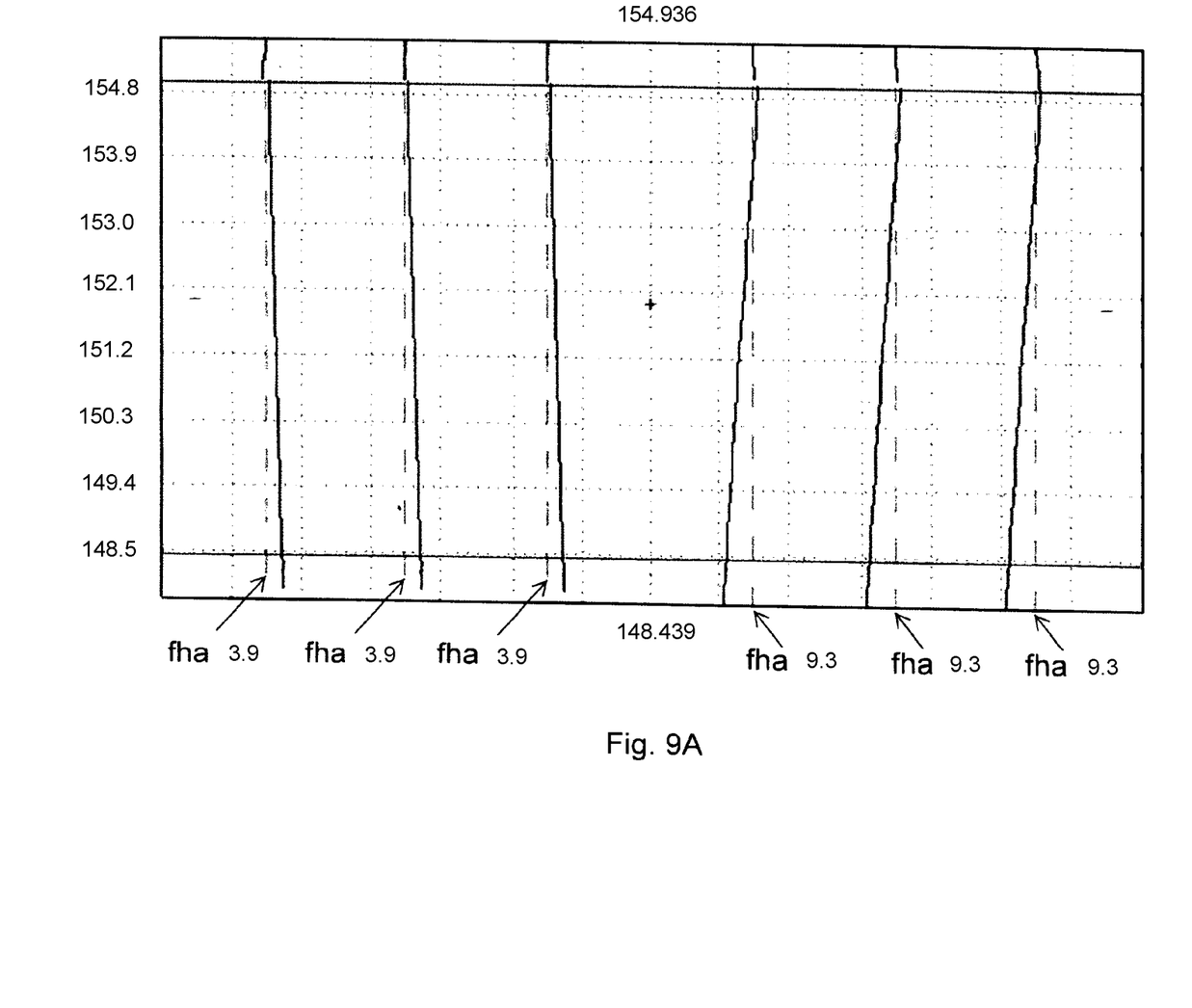
FIG. 9 shows profile angle deviations before (a) and after (b) application of a corrective rake face modification.
Figure 9B:
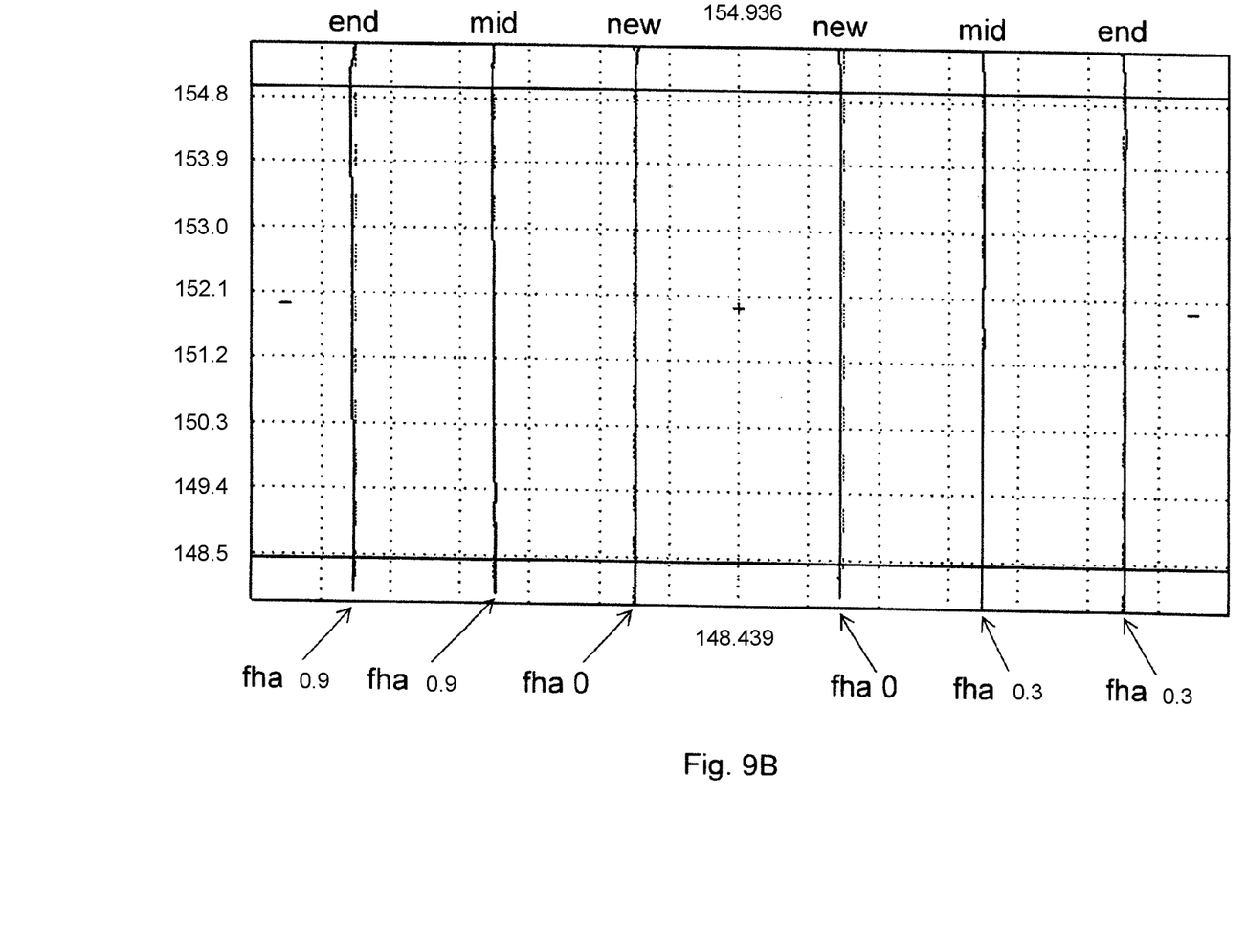

For example, a set of teeth of a workpiece batch has the following gear data: Module 1.7 pressure angle 20° number of teeth 90, helix angle 0 (straight) tooth width 25 mm; root circle diameter 155 mm; tip circle diameter 148 mm, and the cutting wheel used to produce this set of teeth has the following parameters: number of teeth 54; helix angle 10°, as well as a step angle of 10° and a tip rake angle of 5°, and if a profile deviation of 3.9 μm on the left and 9.3 μm on the right is determined for this cutting wheel, as shown in the measurement profile of FIG. 9A, a compensating regrinding of the rake faces of the cutting wheel to a tip rake angle of 3° and a step angle of 12° is carried out in this concrete embodiment. From the measurement profile of FIG. 9B, which was generated by one with the modified (corrected) cutting wheel, it is possible to recognize the effect of the regrinding counteracting the deviation from FIG. 9A.

As can be seen from the above, the invention is not limited to the implementation concretely illustrated in the preceding examples. Rather, the individual features of the above description and the following claims may be essential, individually and in combination, for implementing the invention in its different embodiments.

The invention claimed is:

1. A method for producing or machining, by cutting, an identical set of teeth on each of a plurality of workpieces of a workpiece batch on one or more gear-cutting machine(s) having a gear-cutting tool(S), which has a set of teeth having rake faces (5) and having an axis of rotation, in rolling machining engagement, in which method, in the event that a deviation of a set of teeth from the tooth profile sought for said set of teeth is detected or expected, a countermeasure that counteracts said deviation is determined and the production/machining of additional workpieces of said workpiece batch is continued using the countermeasure, characterized in that the countermeasure is, at least in part, a change in the position ($\varphi$, $\tau$) of the rake faces (5) relative to the axis of rotation of the tool, which change is brought about by means of grinding performed on the gear-cutting machine or at a grinding machine (140) that belongs to the machine group of the gear-cutting machine.

2. The method according to claim 1, in which the gear-cutting tool is not subjected to a coating with a wear-resistant layer between its grinding operation and the continuation of its use.

3. The method according to claim 1 in which a machine axis of the machining engagement is used to position the gear-cutting tool during its grinding operation.

4. The method according to claim 1 in which the machining engagement is that of gear skiving or gear shaping.

5. The method according to claim 1 wherein said plurality of workpieces comprises at least four workpieces.

6. The method according to claim 1 in which the rake faces (5) of the gear-cutting tool (S) are ground to a modified tip rake angle ($\varphi$) during the grinding operation.

7. The method according to claim 6 in which the machining engagement takes place using a two-flank method and the modification of the tip rake angle ($\varphi$) counteracts a symmetry portion of a profile error relative to the deviation on the left and right flank.

8. The method according to claim 1 in which the rake faces (5) of the gear-cutting tool(S) are step-ground and during the grinding operation are ground to a modified step-angle ($\tau$).

9. The method according to claim 8, in which the machining engagement takes place using a two-flank method and the modified step angle ($\tau$) counteracts an asymmetry portion of the profile error relative to the deviation on the left and right flank.

10. The method according to claim 1 in which the countermeasure, in addition to changing the position of the rake faces relative to the axis of rotation of the tool, also includes a dynamic correction in the form of machine axis movements modified in relation to machine axis movements (A1, Y1) for producing/machining the set of teeth with the detected deviation.

11. The method according to claim 10, in which the dynamic correction is independently calculated by the controller which controls the machine axes for the machining engagement depending on the modification made to the rake faces.

* * * * *